United States Patent [19]
Mee

[11] 3,788,542
[45] Jan. 29, 1974

[54] ENVIRONMENTAL CONTROL METHOD AND APPARATUS

[75] Inventor: Thomas R. Mee, Altadena, Calif.

[73] Assignee: Mee Industries, Inc., Altadena, Calif.

[22] Filed: Dec. 31, 1970

[21] Appl. No.: 103,170

[52] U.S. Cl............... 239/2 R, 239/8, 239/11, 239/14, 239/138, 239/318, 239/524, 47/2, 252/359 A
[51] Int. Cl..... E01h 13/00, A01g 15/00, B05b 1/26
[58] Field of Search...... 47/2; 239/8, 521, 542, 519, 239/587, 512, 3, 524, 590.3, 102, 225, 601, 138, 2 S, 2 R, 11, 14, 522; 252/359 R, 359 A

[56] References Cited
UNITED STATES PATENTS

| | | | |
|---|---|---|---|
| 3,067,541 | 12/1962 | Smith | 47/2 |
| 3,084,874 | 4/1963 | Jones et al. | 239/524 X |
| 3,362,640 | 1/1968 | Fainman | 239/590.3 X |
| 3,292,306 | 12/1966 | Carlson | 47/2 |
| 1,846,395 | 2/1932 | Huffaker | 47/2 |
| 2,315,096 | 3/1943 | Sanderson et al. | 47/2 |
| 3,330,069 | 7/1967 | Mihara | 47/2 |
| 3,055,144 | 9/1962 | Johnson et al. | 239/138 |
| 3,063,195 | 11/1962 | Ravich | 47/17 |
| 3,348,922 | 10/1967 | Bose et al. | 47/17 |
| 3,584,412 | 6/1971 | Palmer | 239/318 |
| 3,654,175 | 4/1972 | Henderson | 47/2 |

FOREIGN PATENTS OR APPLICATIONS

| | | | |
|---|---|---|---|
| 14,309 | 5/1924 | Australia | 47/2 |
| 791,012 | 7/1968 | Canada | 239/522 |
| 1,002,584 | 11/1951 | France | 239/512 |
| 820,436 | 9/1959 | Great Britain | 47/2 |
| 842,875 | 7/1952 | Germany | 239/124 |

OTHER PUBLICATIONS

"Pureco Carbon Dioxide Carbo–Culture for Greenhouse Growers," Pamphlet, Received in U.S. Patent Office on October 2, 1963, 4 pages.
"Carbon Dioxide Systems for Growing Plants," Paper Presented Before ASAE Meeting on June 1968. Appears in ASAE Publication PROC–270, Bailey et al., 6 pages.

*Primary Examiner*—Robert S. Ward, Jr.
*Attorney, Agent, or Firm*—Christie, Parker & Hale

[57] ABSTRACT

Control of the temperature and humidity of an environment is obtained by injecting a large volume of water droplets into the air with a major portion of the water droplets being in the range of from about 5 to 50 microns in diameter and with an average diameter in the range of from about 10 to 30 microns. In one embodiment such environmental control is employed for cooling an outdoors area wherein the droplets provide evaporative cooling. When temperatures are low a fog of water droplets essentially opaque to infrared is provided as a cover to crops for preventing frost damage. In another embodiment means for injecting water droplets are arranged within a roofed shelter having sides open at the top and bottom for permitting air circulation. In another embodiment a visible cloud is provided for decorative effect or as a medium on which an image can be projected.

Fog having droplets in the above-mentioned size range is produced by impacting a stream of water having a diameter in the range of from about 125 to 400 microns at a velocity in excess of about 135 feet per second against a smooth, solid surface. Such impact causes the stream of water to separate into droplets in the selected size range. In one embodiment a nozzle having an orifice in the range of from about 125 to 400 micron diameter and operated at a pressure in excess of about 350 psi is used to create a water jet. A flat surface having substantially the same diameter as the orifice, normal to the orifice, closely aligned with the orifice, and spaced only a short distance from the orifice is employed for impacting the stream coming out of the orifice. In another embodiment a surface having compound convexity is arranged in front of the orifice at a distance of up to about four millimeters. A complete system involves a large plurality of such nozzles supplied with water substantially free of particles having a size larger than about 1/10 the diameter of the orifice, and at a pressure in excess of about 350 psi. Automatic control of such a system in response to temperature and wind velocity and direction is also provided.

20 Claims, 14 Drawing Figures

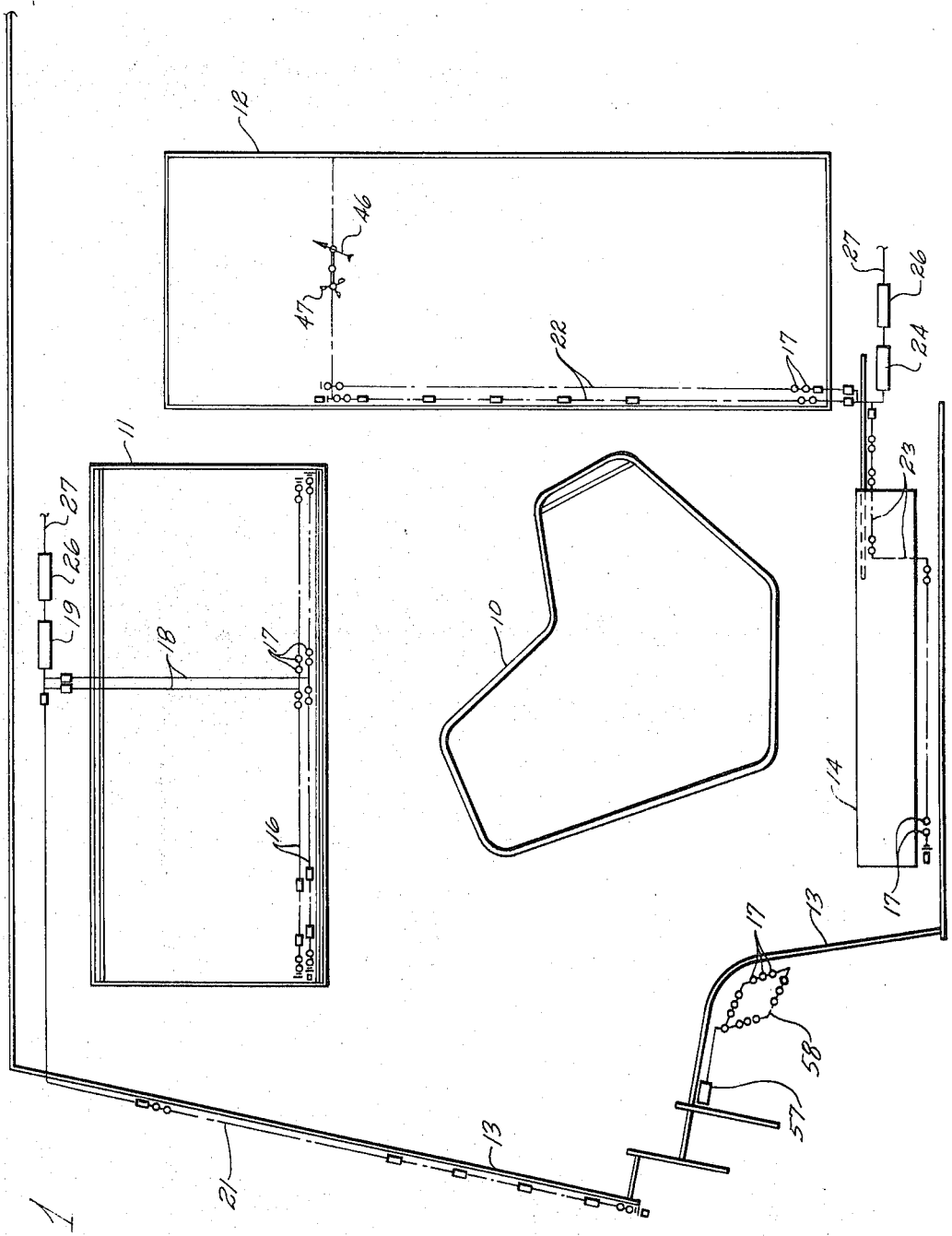

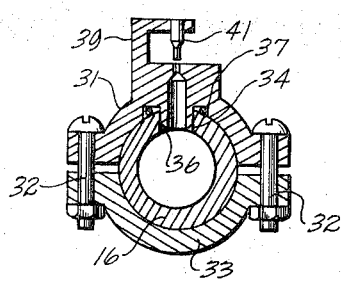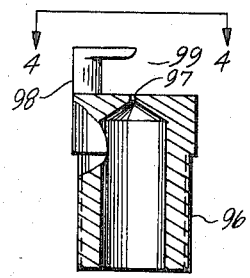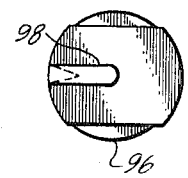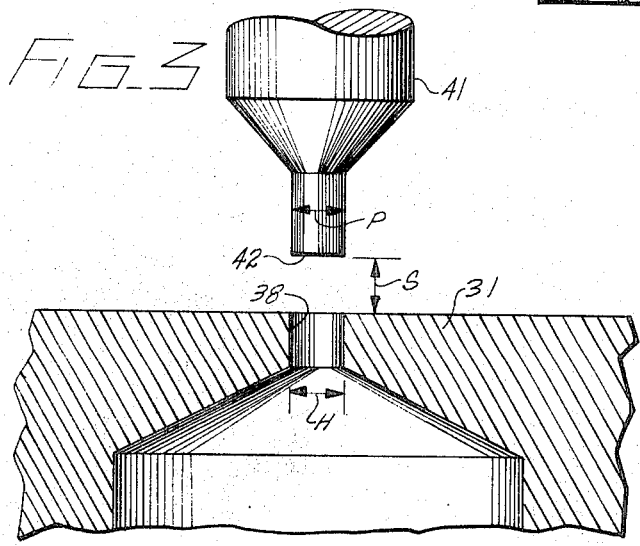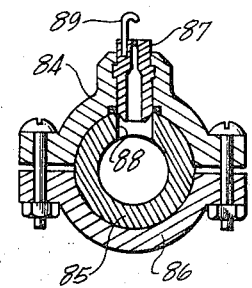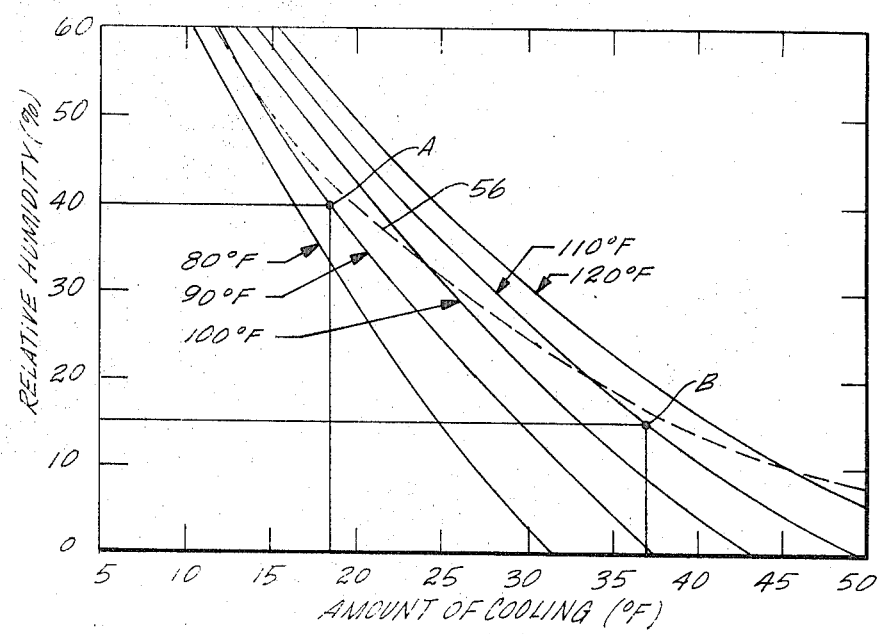

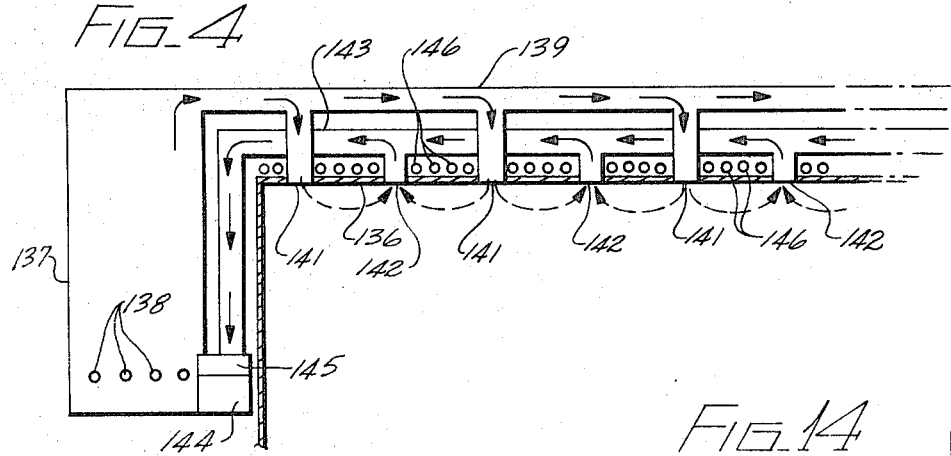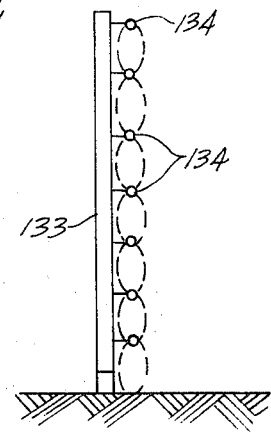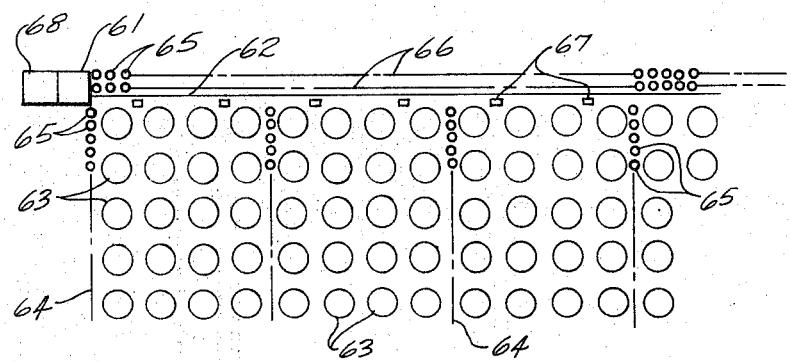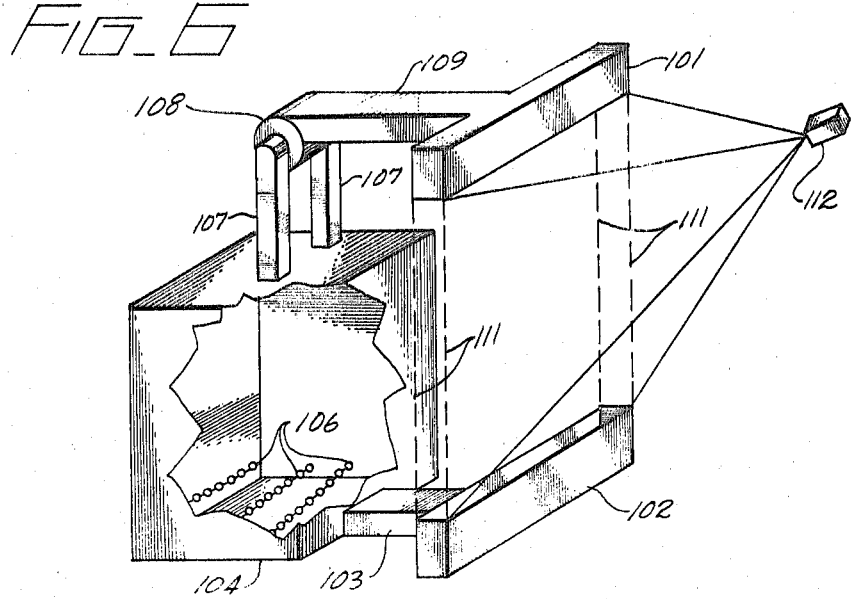

PATENTED JAN 29 1974
3,788,542
SHEET 4 OF 4
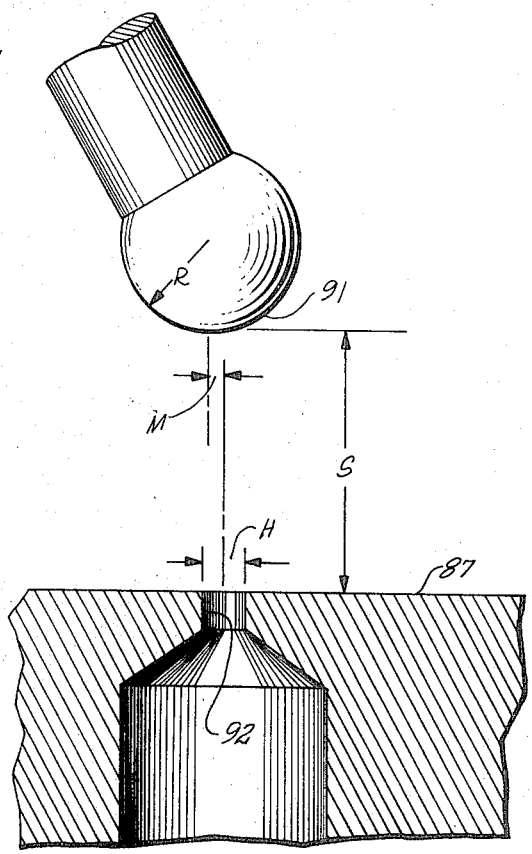
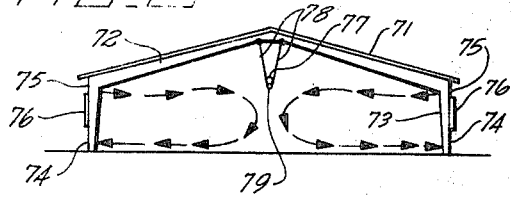
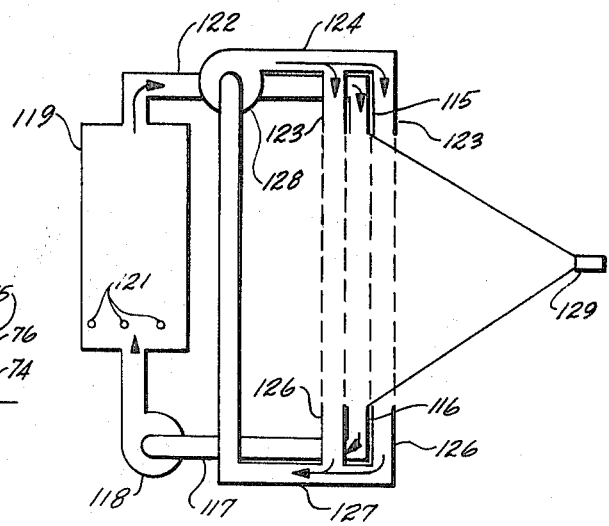

3,788,542

ENVIRONMENTAL CONTROL METHOD AND APPARATUS

BACKGROUND

Evaporative cooling for reducing elevated temperatures in the environment has been attempted employing so-called pin nozzles for creating a fine spray of water distributed in the region to be cooled. Such an arrangement has been provided, for example, at market vegetable counters; however, such arrangements are not suitable for general environmental control. The difficulty with conventional pin nozzles has been that the spray produced is in the form of relatively large droplets that have a substantial fall velocity so that they settle out on the surrounding surfaces and are not readily available for direct evaporation from the droplets into the environment. In the prior art, all such arrangements have had sufficiently large droplets that a major portion of the water falls to the surrounding surfaces rather than appreciably cooling any mass of air.

It has been recognized that in order to provide protection to crops against front damage that a blanket of dispersed material opaque to infrared radiation is effective. Cooling of crops in low temperatures occurs most rapidly when the air is clear and the heat stored in the crops and soil is radiated into space at a high rate. It has long been recognized that fog, or clouds or the like inhibit free radiation of infrared from the soil and crops and thereby inhibit frost damage.

In order to produce such clouds, burning of sooty materials such as oil or old tires has been employed, however, the contamination of the environment due to the sooty material is highly objectionable and the particle size in the smokes produced is generally too small to be of maximum effectiveness for inhibiting radiation in the infrared spectrum.

Cloud generators employing a mixture of combustible material and water have also been employed and produce large amounts of fog that is objectionable because of the pollution due to the burning oils employed, and further the energy requirement for the system is excessively high.

In another system, water and hexadecanol or cetyl alcohol has essentially been boiled to produce a fog. Such a fog has water droplets in the size range from about one to 10 microns which has high opacity for visible radiation but is relatively transparent to infrared. Further, such a fog is relatively warm due to the required heating and tends to rise away from crops so that the protection is minimized, the fog must be continually produced to replenish that lost. The energy requirements for such fog making are also excessively high since they approach that required to vaporize water, which has an extremely high heat of vaporization.

It is, therefore, desirable to provide a means for producing a large amount of water droplets having a size appropriate for rapid direct evaporation to provide environmental cooling, and also of a size range suitable for scattering infrared radiation for protecting crops against frost damage. The system should provide droplets small enough that the fall velocity is low and the droplets do not, in general, fall to the surfaces in the region where the environment is being controlled. Preferably, the means is operated with low energy requirements for minimized operating cost.

BRIEF SUMMARY OF THE INVENTION

Therefore, in practice of this invention according to a presently preferred embodiment there is provided method and apparatus for environmental control wherein water droplets are injected into a volume of air wherein a major portion of the water droplets are in the range of from about five to 50 microns and the average droplet size is in the range of from about 10 to 30 microns. In a preferred embodiment, such droplets are injected by impacting a stream of water having a diameter in the range of from about 125 to 400 microns and a velocity in excess of about 135 feet per second against a smooth, solid surface. Such impacting can, for example, be obtained by squirting water through an orifice of that diameter at a pressure in excess of 350 psi and impacting the stream on a flat surface substantially the same diameter as the orifice, and normal thereto and closely aligned therewith. Similarly, the stream from such an orifice can be impacted against a smooth, solid surface having complex convexity and spaced several millimeters from the orifice. Directional control of the fog produced is obtained by offsetting the center of curvature of the convex surface from the axis of the jet of water.

A plurality of means for injecting water having droplets in the range of from five to 50 microns are combined with a water supply substantially free of particles larger than about five microns at a pressure of at least 350 psi and noncorrodible means for conveying the water to the means for injecting water droplets in order to increase the total water content of a volume of air. Such enables the practice of a method for controlling temperature of an exterior environment, or increasing humidity of an exterior environment, or controlling temperature within a shelter, or preventing frost damage to crops, or providing a medium for projection of an image, or providing artificial snow.

DRAWINGS

These and other features and advantages of the present invention will be appreciated as the same becomes better understood by reference to the following detailed description of a presently preferred embodiment when considered in connection with the accompanying drawings wherein:

FIG. 1 illustrates a plan view a typical installation for environmental control in a residential yard;

FIG. 2 illustrates one embodiment of fog producing nozzle constructed according to principles of this invention;

FIG. 3 is an enlarged detail of the nozzle of FIG. 2;

FIG. 4 illustrates means for blanketing a ceiling with a visible fog.

FIG. 5 illustrates a graph form the cooling obtainable in practice of this invention;

FIG. 6 illustrates application of principles of this invention for projection of images;

FIG. 7 illustrates in plan view an orchard protected from frost damage in practice of this invention;

FIG. 8 illustrates in transverse cross section application of principles of this invention to cooling the interior of a structure;

FIG. 9 illustrates in transverse cross section another embodiment of nozzle constructed according to principles of this invention;

FIG. 10 is an enlarged detail of a portion of the nozzle of FIG. 9;

FIG. 11 illustrates in transverse cross section another embodiment of nozzle;

FIG. 12 is a top view of the nozzle of FIG. 11;

FIG. 13 illustrates another arrangement for projection of images on a curtain of fog;

FIG. 14 illustrates another way of obtaining a bank of fog for projection of images or the like.

Throughout the drawings like numerals refer to like parts.

DESCRIPTION

FIG. 1 illustrates in plan view one arrangement of residential yard the environment of which is controlled according to principles of this invention. As illustrated in this embodiment a yard containing a swimming pool 10 has buildings 11 and 12 along two sides. A fence 13 bounds other sides of the yard for minimizing the direct flow of wind through the yard and also for controlling the aesthetic appearance thereof. A shade structure 14 is provided in one portion of the yard and additional continuous or discontinuous shade structures can be provided as may be desired since control of solar radiation is also an important element of environmental control as well as direct control of air temperature.

In order to cool an outdoors area such as the yard illustrated in FIG. 1, small droplets of water may be injected into the air in large numbers and the evaporation of the droplets extracts heat from the air, thereby effecting substantial cooling. Vaporization of water at typical ambient temperatures extracts heat a a rate in excess of 570 calories per gram of water. Thus, with a relatively small volume of water substantial volumes of air can be cooled a relatively large amount.

In order to obtain optimum cooling, the droplet size of the water should be small so that evaporation can proceed rapidly and completely before the droplets have a chance to fall to ground level or contact other surfaces to which the water adheres and is thereby made relatively unavailable for evaporative cooling. If droplets are larger than about 50 microns in diameter their fall velocity is sufficiently high that a substantial proportion of the droplets reach the ground when released about six to eight feet above ground level, and the evaporative cooling effect is diminished. With nominal relative humidities common in many parts of the United States, droplets smaller than about 50 microns completely evaporate before falling a distance of six or eight feet in absolutely still air. Motion of the air may buoy the small droplets upwardly and enhance the opportunity for evaporation even in higher relative humidities.

In order to assure evaporation in relatively higher humidity environments or at lower temperatures, it is preferred that the droplet size be as small as possible to present the greatest surface to volume ratio of the droplets. It is found, however, that in order to decrease the droplet size much below about five microns the energy requirements become excessive since the curvature of the droplet surfaces is high and high surface energies are involved. It is, therefore, preferred in practice of this invention to inject water droplets into the environment wherein a major portion of the droplets have diameters in the range of from about five to 50 microns. If the diameter of a large portion of droplets is appreciably less than about five microns the energy required to produce the droplets is uneconomically high, and if the droplets are larger than about 50 microns the fall velocity is too high for effective environmental control.

In producing a fog of droplets not all of the droplets have the same diameter, and a range of diameters is actually obtained. It is found to be important that the average diameter of the droplets in the fog be in the range of from about 10 to 30 microns, that is, for example, when the fog has an average droplet diamter of 15 microns, approximately half of the droplets have diameters smaller than 15 microns and approximately half have diameters larger than 15 microns. In a fog having such a size distribution of droplets as provided in practice of this invention, it is found that the mass median diameter is about 30 microns, that is, half of the mass of water in the fog is in droplets having diameters larger than about 30 microns and half of the mass is in droplets having diameters less than about 30 microns.

When the average droplet diameter is less than about 10 microns, the energy requirements for forming the droplets are excessively high because of the high surface energy of the highly curved small droplets. It is, therefore, important that the major portion of droplets have diameters in excess of about five microns, and that the average droplet diameter be greater than about 10 microns. The average droplet diameter should also be less than about 30 microns, and the major portion or droplets have diameters less than about 50 microns. When the average diameter exceeds about 30 microns, the mass of water contained in relatively larger diameter droplets becomes high and the rate of evaporation is thereby lowered. The larger diameter droplets also have a higher fall velocity and these two factors can in many circumstances result in undue settling of fogs produced, thereby wetting surrounding surfaces without achieving desired environmental control.

Since it has been found that fog having the above identified size characteristics is important for environmental control, means are provided in practice of this invention for producing such a fog and providing for its controlled distribution in a region for optimum environmental control.

Thus, as illustrated in FIG. 1 a pair of pipes 16 are provided along the edge of the building 11 adjacent the region in which it is desired to control air temperature. Each of the pipes 16 is provided with a plurality of fog producing nozzles 17 hereinafter described in greater detail. In a typical embodiment, each of the pipes 16 has nozzles spaced approximately every foot along the pipe. The nozzle bearing pipes 16 on the building 11 may, for example, be located about 15 feet above ground level. Connector pipes 18 interconnect the nozzle bearing pipes 16 with a higher pressure pump 19. Also connected to the pump 19 is another nozzle bearing pipe 21 running along the top of the fence 13 approximately six feet above ground level.

In a similar manner, a parallel pair of nozzle bearing pipes 22 are provided along the edge of the building 12 adjacent the yard to be cooled, and an additional nozzle bearing pipe 23 is provided adjacent the shade structure 14 so that the environment controlled region is approximately surrounded by nozzle bearing pipes. These latter nozzle bearing pipes 22 and 23 are connected to a second high pressure pump 24 similar to the pump 19. On the suction side of each of the pumps 19 and 24 is a filter 26 connected to the inlet water supply 27 from a water main or the like. The filters 26 are preferably multi-stage filters having a final stage for removing substantially all particles having a diameter greater than about five microns. This high degree of filtration is found to be quite important for operation of the system which involves very small diameter orifices in the nozzles 17 as hereinafter described in greater detail. More generally speaking, the final stage of filtration should remove substantially all particles larger than about 1/10 the diameter of the orifices of the nozzles, and preferably a fine degree of filtration wherein all particles larger than about five microns are removed is preferred. If particles larger than about 1/10 the diameter of the nozzle orifices are present in the water, plugging of nozzles may occur.

The pumps 19 and 24 produce pressures in excess of about 350 psi, and preferably in the range of about 350 to 500 psi, at the flow rates required to supply the number of nozzles in each pipe combination. Higher pressures can be employed if desired, however, the energy requirements for obtaining the higher pressures do not increase the performance of the system sufficiently to justify the additional cost. It is preferred that the filters 26 be on the suction side of the high pressure pumps 19 and 24 since low pressure filters are considerably more economical than high pressure filters. If desired, however, an additional fine filter can be provided on the pressure side of the pumps for removing any particles introduced in the pumping operation.

Because of the use of small orifices in the nozzles 17, it is important that the various pipes employed in the system and the nozzles be constructed of materials that are substantially noncorrodible in water so that additional particles and corrosion products do not accumulate in that part of the system downstream from the filters. Likewise, it is important in installing such a system to assure that the components of the system are adequately flushed with filtered water or the like so as to remove any particles present in the system prior to installation. Bronze, copper, stainless steel and various plastic materials such as polyvinyl chloride of sufficient strength to support an internal pressure of at least 350 psi are satisfactory for fabrication of pipes, nozzles, valves and the like.

FIG. 2 illustrates in transverse cross section an embodiment of fog producing nozzle constructed according to principles of this invention and capable of producing a major portion of droplets in the size range of from about five to 50 microns and having an average droplet diameter in the range of from 10 to 30 microns. As illustrated in this embodiment, the fog nozzle 17 is in the general form of a saddle tee having a plastic body 31 capable of withstanding an internal pressure of at least 350 psi and preferably in excess of about 500 psi since it is found that pressures in this range are important in practice of the invention. The plastic body 31 is secured to a pipe 16 by a pair of bolts 32 and a U-shaped bracket 33 on the opposite side of the pipe from the body. A small internal tubular extension 34 on the body is inserted in a hole 36 drilled through the side of the plastic pipe. The body is sealed to the pipe by an O-ring 37 around the extension 34.

A small orifice 38, better seen in the enlarged view of FIG. 3, is provided between the interior of the body 31 and the exterior. The length of the small orifice 38 is not extremely critical but it should be short enough that fluid friction is not excessive and should be longer than mere knife edge, which as a practical matter would not be obtained without special processing. The diameter H of the orifice is, however, of importance, and should be in the range of from about 125 to 400 microns so that a stream of water passing through the orifice has a diameter in this range.

If the orifice has a diameter less than about 125 microns, several disadvantages accrue. Such a small orifice is particularly susceptible to plugging due to small particles, corrosion products or the like, and orifices larger than this are less susceptible to plugging. A smaller orifice is also much more difficult and expensive to form. Most particularly, however, the quantity of water that can be forced through the orifice at reasonable pressures when it is less than about 125 microns is quite small and an excessive number of nozzles would be required in order to obtain a practical total volume of water from a system. Thus, if the orifices are less than about 125 microns in diameter, the nozzles are more expensive to make and a considerably increased number of them are required. Additionally, when the orifice size is reduced below about 125 microns, the droplets formed by the nozzle are somewhat smaller and hence have a greater surface energy, thereby increasing the energy requirements to properly operate the nozzle. Thus, for numerous reasons, it is found that a minimum orifice diameter of about 125 microns is critical.

The maximum practical diameter of the orifice is about 400 microns, although this limit has not been determined with precision. It is known that an orifice having a diameter of about 250 microns is eminently satisfactory at water pressures in excess of 350 psi, and that an orifice having a diameter of 500 microns is not satisfactory at pressures as high as 1,000 psi. The larger diameter orifice results in a substantial number of droplets in the resultant fog having diameters greater than about 50 microns and these are beyond the preferred range described hereinabove.

The purpose of the orifice 38 is to obtain a high velocity stream of water having a diameter in the range of from about 125 to 400 microns. It is important that this stream of water have a velocity in excess of about 135 feet per second in order to produce fog droplets, a major portion of which are in the size range of from about five to 50 microns and which have an average diameter in the range of from about 10 to 30 microns. In order to achieve this high velocity in the small diameter stream, a pressure in excess of about 350 psi is required in the system, and preferably the pressures are in the range of about 350 to 500 psi. Higher pressures can be employed; however, the energy requirements for obtaining the high pressures are high and the slightly increased flow rate of water through the orifice does not justify the additional expense in the installation and operating costs.

In order to break the high velocity stream of water into droplets in the range of five to 50 microns, the stream is impacted against a smooth, solid surface that serves to spread the stream.

In the embodiment illustrated in FIGS. 2 and 3, an L-shaped arm 39 extending upwardly from the body 31 hooks over and supports a cylindrical pin 41 directly over the orifice 38. The pin 41 has a smooth, flat end surface 42 substantially normal to the axis of the orifice 38. The end surface 42 has a diameter P substantially identical with the diameter H of the orifice 38, that is, in the range of from about 125 to 400 microns. It is quite important that the flat surface 42 be carefully aligned with the orifice 38 so that the offset between the center of the surface and the axis of the orifice is less than about 15 microns. This close alignment is required so that the high velocity water stream is certain to impact the flat surface squarely so that very little, if any, of the stream can pass the surface without hitting or being deflected by it. If any significant quantity of the stream does pass the surface without impact, relatively large droplets are obtained outside the preferred range.

It might be supposed that criticality of alignment of the pin with the orifice could be minimized by employing a pin significantly larger in diameter than the orifice. A small enlargement can in fact be tolerated; however, as the diameter of the flat end of the pin is increased, the direction of spreading of water from the nozzle becomes flatter rather than a cone shape, thereby increasing the probability of the resultant fog droplets striking surrounding surfaces or interacting with droplets produced by adjacent nozzles. Larger diameters also tend to make the shape of the edge of the pin more critical since an irregularity in this edge may disrupt the uniform flow of water and cause a portion of the fog to have relatively large droplets outside the preferred range.

Concomitant with the requirement of close axial alignment of the end surface of the pin with the orifice is the requirement that the spacing S between the flat surface 42 and the orifice 38 be about the same as the diameters of the orifice and pin. This requirement arises from the fact that a high velocity stream of water such as emerges from the orifice tends to oscillate laterally at a frequency and amplitude depending on the size and velocity of the stream and the physical properties of the water. By maintaining the spacing S spproximately the same as the diameter of the stream of water, the inherent oscillations do not cause the stream to deviate sufficiently that any significant fraction of the stream fails to impact or be deflected by the flat surface 42.

When the high velocity water stream squarely impacts the surface 42 it is spread radially and travels outwardly a short distance as a continually thinning cone-shaped sheet. This radiating cone-shaped sheet of water also becomes thinner and oscillates as it travels radially, and in a short distance the oscillation builds to a point that the sheet breaks into a plurality of radiating filaments or tiny cylinders of water traveling at high velocity. These high velocity filaments in turn oscillate and in a short distance break up into a large number of individual droplets.

The diameter of the filaments formed as the sheet of water oscillates is dependent on the velocity of the water and also the thickness of the sheet. If the orifice diameter is too large, the thickness of the sheet is so great that the filaments formed upon breaking up of the sheet are too large to form droplets, the major portion of which are in the range of from about five to 50 microns and which have an average diameter in the range of from about 10 to 30 microns. Likewise, if the velocity of the stream of water is too low, the surface tension or surface energy properties of the water tend to pull the sheet together, i.e., make a steeper cone, or even cause the sheet of water to converge rater than diverge, and again the filaments formed are too large to break into droplets having a major portion in the range of from five to 50 microns. Thus, it is important that the water stream impacting on the solid surface be sufficiently small and sufficiently fast to obtain the preferred range of droplet sizes.

It will be apparent, of course, that this also explains the need for maintaining the position of the flat surface in line with the orifice, and maintaining the spacing S within the indicated limits. If the stream has a substantial portion that fails to be deflected by the solid surface, that portion of the sheet of water formed may be excessively thick to form small enough filaments. Likewise, by failing to impact the surface, the direction of the flow of the water is not changed sufficiently and that portion of the sheet may not radiate from the pin at a sufficient velocity to break into proper size filaments to obtain droplets smaller than 50 microns.

A particularly preferred embodiment of nozzle constructed in the manner illustrated in FIG. 3 has an orifice diameter H, a pin diameter P, and a spacing S therebetween, all of about 250 microns. This embodiment is particularly preferred since it provides reliable operation, droplets of nearly optimum size, and is economical to manufacture and operate. When such a nozzle is operated at a pressure in excess of 350 psi it produces water droplets having an average diameter of about 15 microns, a major portion of which are in a size range of from about 10 to 50 microns. Droplets so produced evaporate rapidly and completely under conditions where the air is less than saturated with water vapor, and produce a fog of particular utility when the relative humidity approaches 100 percent. This size range is near optimum for maximum of backscattering of infrared radiation. Such a fog also has a relatively high degree of opacity in the visible region for providing a suitable medium on which to project an image. A nozzle constructed with these dimensions can be made without exorbitant manufacturing costs, and the volume of water that can be passed through the orifice is sufficiently large that only a moderate number of such nozzles are required in most systems.

If the aforementioned nozzle dimensions are increased substantially above about 250 microns, the water droplet diameters are increased, thereby reducing the rate of evaporation and the backscattering efficiency for infrared. If the orifice diameter and other related dimensions are decreased substantially below about 250 microns, the manufacturing costs increase at a substantial rate, and so do the number of nozzles required in a system in order to achieve a selected total quantity of water injected into the environment. Thus, it is found that a nozzle having an orifice diameter, pin diameter, and spacing each of about 250 microns is highly advantageous for environmental control purposes.

It will be recognized that the size of droplets obtained is a function of stream diameter and velocity and also the surface properties of the water. Therefore, some reduction in the velocity or increase in size may be obtained by adding a small quantity of surfactant to the water in order to reduce the surface energy, and it should be understood that such modification is within the scope of practice of this invention. It is preferred, however, the "pure" water be employed without addition of surfactant for a variety of reasons, not the least of which is the difficulty of adding surfactant with precision in the small quantities required in a continuous flow system such as employed in practice of this invention.

FIG. 4 illustrates in block form an automatic control system for environmental control according to principles of this invention. Such an arrangement can be employed for cooling an outdoors area such as the yard illustrated in FIG. 1 or an agricultural area or, by selecting the appropriate control parameters, a similar system can be employed for producing fog for preventing frost damage to crops, for producing fog which freezes into snow for augmenting natural snow on ski runs, or for controlling temperature within a structure such as hereinafter illustrated and described in greater detail.

In the illustrated arrangement the temperature in the yard of FIG. 1 is controlled by manually operating the various lines of fog nozzles. If desired, however, automatic control can be employed with the extent and location of water droplet injection being determined by wind direction as measured by a vane 46 and velocity as determined with an anemometer 47 mounted in any convenient location such as on top of an adjacent building. A thermostat (not shown) within the control area actuates the system when the temperature rises. If desired a relative humidity sensor (not shown) can be employed for limiting the injection of water into the environment for maintaining the yard within a reasonable comfort zone.

FIG. 5 illustrates the degree of temperature reduction that is obtainable under various conditions in practice of this invention. FIG. 5 comprises a graph having the relative humidity in per cent along the ordinate and the amount of cooling obtainable in degrees Fahrenheit along the abscissa. A family of curves are plotted on the graph of FIG. 5 representing a series of starting temperatures in degrees Fahrenheit. This shows the amount of cooling that can be obtained in practice of this invention from a selected starting condition.

Thus, for example, if the temperature is 90°F and the relative humidity is 40 percent, as indicated at point A on the graph, a cooling of air temperature up to about 18°F can be obtained by injecting water droplets into the air and permitting the droplets to evaporate before falling to the surface. As another example, if the temperature is at 110°F with a relative humidity of 15 percent as may commonly be found in the Southwest part of the United States, a cooling of as much as 37° can be obtained. A dashed line 56 across the graph defines the starting conditions from which a final temperature of 75°F or less can be obtained, that is, if the relative humidity and starting temperature are to the left and below the line 56, injection of water droplets into the air can bring the air temperature to 75°F or less. In a dry climate wherein the relative humidity is low, a large degree of cooling can be obtained since the quantity of water that can be evaporated into the air before saturation is relatively large, and even when high ambient temperatures are encountered the environment can be brought to a comfortable range of 75°F or below. When the relative humidity is high, the total quantity of water that can be evaporated into the environment and hence the total quantity of heat that can be extracted from the air is lower, and less effective cooling is obtained.

Because of this, cooling of the environment is readily obtained in low humidity situations since substantially all of the water droplets injected into the air will evaporate prior to falling to any solid surfaces even in absolutely still air. As the water evaporates from the tiny droplets, the relative humidity of the air increases, and if additional water droplets are injected eventually a point is reached where the relative humidity approaches 100 percent. From then on, addition of water droplets causes accumulation of a visible cloud or fog. The formation of such a visible fog does not provide any additional significant cooling of the air mass within the fog, but such a fog is useful for a variety of purposes.

Thus, for example, the mere presence of a fog or cloud subject to the changing patterns caused by the vagaries of the wind and other air currents can produce a highly decorative and entertaining effect. Referring again to FIG. 1, an additional high pressure pump and filter system 57 is connected to a pipe 58 having a large plurality of nozzles 17 closely spaced in a small area and preferably in a three dimensional pattern for best decorative effect. Because of the high density of fogging nozzles 17 in this area, it is possible, even in a relatively low humidity environment, to reach 100 percent relative humidity in a limited air mass. Thereafter, a visible fog is produced that rises, falls and drifts to the side as affected by air currents to provide a highly decorative fog "fountain" in one portion of the yard. It will be apparent that many patterns of fogging nozzles in close proximity can be provided so that a variety of decorative effects can be obtained.

A particularly pleasing and useful decorative effect is obtained by producing a substantially vertical "wall" of fog upon which an image is projected as illustrated in FIG. 6.

As illustrated in this embodiment, there is provided an elongated upper plenum 101 arranged directly above a similar lower plenum 102. The bottom of the upper plenum 101 is open and a top of the lower plenum 102 is open so that the two plenums have open portions facing each other. A duct 103 runs from the lower plenum to a fog chamber 104, which is in effect a moderate size room in which a plurality of nozzles 106 are arranged. The fog nozzles are substantially similar to those hereinabove described for generating a dense fog having water droplets suspended therein in the size range of from about five to 50 microns. At the top of the fog chamber 104 are a pair of upwardly extending ducts 107 leading to the inlet of a conventional centrifugal blower 108. A duct 109 leads from the blower 108 to the upper plenum 101.

In order to operate the system illustrated in FIG. 6 the blower 108 is activated to supply air to the upper plenum 101, and at the same time to suck in air through lower plenum 102. This soon establishes a steady flow of air out of the upper plenum 101 and into the lower plenum 102, as indicated by the dotted lines 111. Such a flow of air extending over the length of the plenums and across the space therebetween is known as an air curtain. Such arrangements are known in the art and are, for example, employed at the entrances to buildings for minimizing loss of heated or cooled air or the like. The specific duct and plenum designs, flow rates and the like are well known to those skilled in the art, and, forming no part in this invention, are not further described herein.

One thing that has been added to the more or less conventional air curtain system is the fog chamber 104 having fog generating nozzles 106 arrayed therein. The fog nozzles eject water droplets, the major portion of which are in the size range of from about five to 50 microns, and these rapidly fill the fog chamber 104 with a dense opaque fog. A relatively large fog chamber is provided since the fog nozzles typically require about six feet of free space before any solid surface is contacted so that the spray of water can break up into the finest droplets before any solid surface is encountered. Otherwise, the surfaces may be wetted by the spray of water droplets and the efficiency of fog production minimized. By having a relatively large fog chamber 104, the few relatively large droplets that may form are permitted to fall out in the relatively quiescent flow in the fog chamber so that the fog drawn into the ducts 107 at the top of the chamber is largely free of droplets having diameters significantly larger than about 50 microns. The fog produced in the fog chamber 104 is thus passed through the blower 108 to the upper plenum 101 from which it flows in the air curtain to the lower plenum 102 where it returns to the fog chamber. Continual replenishment of the fog is needed since some is lost by vaporization from the air curtain and a certain amount of clear air is drawn into the lower plenum 102 By maintaining fog in the chamber 104, the air curtain 111 becomes substantially opaque when of sufficient thickness, and with a suitably dense fog a thickness of only two or three feet may be sufficient to make a reasonably opaque fog curtain. If desired a nephelometer or the like may be employed for measuring the density of the fog produced in order to achieve a desired degree of opacity in the fog curtain.

A projector 112 is arranged in front of the fog curtain 111 so as to project an image on the front face of the fog curtain. Because of the air curtain effect, the front face of the fog curtain is relatively flat and, therefore, good scattering and return of the image projected on the fog curtain is obtained. Since the image is reflected from various portions of the fog curtain rather than from a signal plane, a very realistic three dimensional effect is obtained. Thus, for example, the image of a person may be projected on the fog curtain and a person may step into the fog curtain and the visual effect of both is so similar that it is often difficult to distinguish the real person from the projected image. It is preferred that the image projected on the fog curtain be projected from the front side since the density and thickness of the fog is not so critical for obtaining a good visual image; however, it will be apparent that projection from the rear can be employed if desired. This is particularly true when the only effect desired is one of light and color or very large images rather than distinguishable images having fine detail.

FIG. 13 illustrates a variation of fog curtain for projection of images in accordance with principles of this invention. As illustrated in this embodiment, a conventional elongated upper fog plenum 115 is arranged above a lower fog plenum 116. The two plenums have their opposing faces open so that air can flow out of the upper plenum 115 and into the lower plenum 116. A duct 117 leads from the lower plenum 116 to a centrifugal blower 118 whic discharges into a fog chamber 119. Within the fog chamber are a plurality of fog generating nozzles 121, which preferably generate water droplets having a principal portion in the size range of from about five to 50 microns for creating a dense and relatively opaque fog. The fog from the fog chamber 119 flows through a duct 122 to the upper pelnum 115.

Arranged on each face of the upper plenum 115 is a plenum 123 fed by a common duct 124. On each face of the lower fog plenum 116 is a lower air plenum 126 which leads to a common return duct 127. Air is circulated through the duct 127 to a conventional blower 128, which discharges into the upper duct 124. With such an arrangement a pair of parallel air curtains are formed between the upper air plenums 123 and lower air plenums 126. Sandwiched between these air curtains is a fog curtain extending from the upper fog plenum 115 to the lower fog plenum 116. By sandwiching the fog curtain between the two air curtains which move therewith, the front and back surfaces of the fog curtain are maintained much more flat than when a fog curtain only is employed. With such flat front and back surfaces, projecting from a projector 129 provides a superior image to one on a fog curtain alone. The air curtains on either side of the fog curtain also serve to augment the usefulness of the fog curtain in exterior situations where wind may disturb the fog curtain. Greater curtain stability is obtained with the air curtains sandwiching the fog curtain. The air curtains also serve to minimize mixing of the fog curtain with the surroundings for avoiding increases in humidity which may be undesirable indoors. A single air curtain between a fog curtain and a room may be used with a wall on the other side of the fog curtain. Coloring or lighting of the wall behind the fog curtain may enhance the effects obtained.

FIG. 14 illustrates another arrangement for obtaining a fog curtain upon which an image may be projected. As illustrated in this arrangement, which is particularly useful in an outside environment, a vertically extending screen 133 provides support for several banks of fog nozzles 134 arrayed in horizontally extending rows vertically spaced apart. The fog produced by the fog nozzles 134 is somewhat cooler and hence denser than the surrounding air, and therefore tends to fall along the forward face of the screen 133. The fog tends to dissipate by evaporation to the surrounding air as it falls, and therefore several banks of fog nozzles are provided, one above the other If desired suction may be provided near the bottom of the screen for aiding flow of the fog downwardly.

In this way a relatively large vertical extent may be blanketed in a "wall" of fog. In such an arrangement, for example, the screen 133 may be fifty feet high and a hundred feet wide so that a fog screen of similar height and width is produced. This is sufficiently large that large outdoor advertising messages may be projected on the fog by conventional means (not shown), such as the projectors commonly used for outdoor theaters. Very unusual and startling effects can be obtained by projection on such fog banks.

The screen 133 can be a substantially impervious wall so that wind patterns do not disturb the vertical bank of fog produced by the fog nozzles. This permits the use of the fog system in situations where a relatively brisk breeze may be encountered. If desired, on the other hand, the screen 133 can be made of a substantially open lattice that is only sufficient for supporting the weight of the pipes and fog nozzles so that when fog is produced an opaque wall of fog is present for projection of images, and when no fog is produced the supporting structure appears not to exist at all. It will be recognized, of course, that such an arrangement is best suited for nighttime use.

It will also be apparent, of course, that in lieu of a screen 133 the same effect may be obtained adjacent a building wall and the wall of fog may be either on the inside or outside of the building, as may be desired. With such an arrangement it is, therefore, possible to generate a bank of fog extending around the sides of a room so that one has the illusion of being in a sea of fog rather than in an enclosed area. Generally speaking, however, in an interior situation it is preferred to use a fog curtain generated in the manner illustrated in FIGS. 6 and 13, in order to minimize increases in humidity that may occur when a system such as illustrated in FIG. 14 is employed.

Within an enclosed area it may also be desirable to blanket a ceiling with fog to complete the illusion of being surrounded in a sea of fog rather than in an enclosed area. A suitable arrangement for blanketing the ceiling of a structure with a bank of fog is illustrated in FIG. 4. As illustrated in this arrangement, there is provided a ceiling 36 in a room or over some similar area as may be desired. A fog chamber 137 is positioned at some convenient location near the ceiling 136 to be blanketed by fog. A plurality of fog nozzles 138 are provided in the fog chamber for generating an opaque fog. A duct 139 from the upper portion of the fog chamber 137 discharges at a plurality of locations 141 through the ceiling 136. Intermediate between the discharge points 141 are a plurality of inlets 142 through the ceiling leading to a return duct 143. The return duct 143 leads to a conventional blower 144 that circulates air back to the fog chamber 137 and through the entire system. A heater 145 may also be associated with the blower 144 for raising the temperature of the fog. If desired, the heater 145 may be omitted from this point and heating may be obtained by discharging warmed water through the nozzles 138 rather than water at ambient temperature. In either case it is desired to produce a relatively warm fog in the fog chamber 137, typically at a temperature a few degrees above the temperature in the room covered by the ceiling 136.

Fog from the fog chamber 137 is discharged near the ceiling through the outlets 142, and since it is warm it is relatively less dense than the air in the room and tends to remain adjacent the ceiling. Since fog is continually being withdrawn from the region adjacent the ceiling through the inlets 142 for recycling to the fog chamber, the relatively warm fog adjacent the ceiling tends to flow from the discharge ports 141 to the inlets 142, as indicated by the dotted arrows. The pattern of fog adjacent the ceiling can be varied by varying the positioning of the inlets and outlets, and the velocity of flow to provide a variety of interesting and decorative effects. If desired, lights or images may be projected on either the front or back surfaces of the fog adjacent the ceiling for additional decorative effects. It is also desirable to provide heaters 146 adjacent the ceiling 136 for maintaining its temperature slightly above the dew point of the fog in order to prevent condensation and dripping from the ceiling.

Another very useful arrangement for employing an environmental control system constructed according to principles of this invention is illustrated in FIG. 7 which comprises a plan view of a small part of a citrus orchard or the like. As illustrated in this embodiment, a high pressure pump and filter system 61 is connected to a pipe manifold 62 extending along one edge of a grove of trees 63. Connected to the manifold 62 and extending through the orchard at an elevation above ground level somewhere near the tops of the trees 63 are a plurality of pipes 64, each fitted with a plurality of fog producing nozzles 65 along their length. During a calm night when cool air may pocket in the orchard, the system is activated for producing fog at the nozzles 65, which serves to raise the dew point in the orchard and also generate substantially opaque fog.

In addition to the fog producing pipes 64 extending through the orchard, it is desirable to provide one or more pipes 66 also having fog nozzles 65 along at least one edge of the orchard. In the illustrated arrangement, a single high pressure pump and filter system 61 is illustrated, however, it will be apparent that a plurality of such systems may be employed or valving may be used for operating some or all of the fog producing portions as may be desired.

The fog produced in the orchard is cool and tends to lie near the ground and actually flows downhill since it is more dense than the surrounding air. The extra bank or banks of fog nozzles along the edge of the orchard are preferably at the uphill edge for producing a surplus of fog in this region which slowly drifts downhill through the balance of the orchard. When an orchard is arranged on a slope, it may be necessary only to have fog generating means along the uphill edge of the orchard permitting the natural flow of the fog to the downhill portions to provide frost protection throughout the area to be protected. If, on the other hand, the orchard is in a substantially flat area, it is preferred to employ fog generating nozzles throughout the orchard for protecting the full area.

Even in a substantially flat area there is a gradual drift of air downhill since virtually no agricultural area is actually completely flat. Although this drift may be slow, it can raise a problem if the air entering the orchard is below freezing due to heat transfer to surrounding areas that are not protected by a system as provided in practice of this invention. In such a situation it is desirable to employ the banks of fog nozzles along the uphill edge of the orchard to assure protection of the first few rows of trees therein.

If the air entering the uphill edge of the orchard is already below the freezing temperature, it may be desirable to augment the protective effect of the fog producing system provided in practice of this invention, and means may be provided for adding heat to the area along at least the uphill edge of the orchard. Radiant heaters or the like can be employed since this tends to warm the fog and heat the surrounding region; however, most such heaters have a substantial heat loss to higher altitudes due to convection currents, and they do not always prove economical.

A preferred way particularly useful in combination with the fog producing system employs a plurality of conventional sprinklers 67, indicated Only schematically in FIG. 7, along at least the uphill edge of the orchard. The water supplied to the sprinklers 67 is preferably substantially above the freezing point and may, for example, be heated to 90° or 100°F with great benefit. In some regions natural ground water is this warm, however, in most areas it is necessary to heat the water prior to sprinkling through the sprinklers 67. This heating can be done with ordinary fuels, however, it is preferred to employ solar energy for heating the water which is then stored until needed. This turns out to be an excellent way since the supplemental heating obtained by sprinkling is required only during relatively brief periods, and solar energy is conveniently accumulated and stored in water stored in insulated reservoirs.

The water employed in the fog nozzles can also be heated if desired in order to enhance the heating effect adjacent the edge of the orchard. This is not always sufficient for preventing frost damage as cold air drifts into the orchard from surrounding regions since the total quantity of water that is injected into the environment from the fog nozzles is relatively small, and the total heat that can be added by using warm water in the fog nozzles is relatively small compared with the heat that can be added by employing sprinklers in combination with means for generating fog.

It will be apparent that if desired an arrangement can be employed for protecting crops other than orchards or the like. Other arrangements of pipes in or near an orchard can be used depending on local conditions.

In order to operate the system illustrated in FIG. 7 for protection of crops from frost damage, temperature is monitored, and when the temperature reaches no less than about 40°F and threatens to reach freezing the pump and filter system 61 is started so as to inject water droplets in the size range of from about five to 50 microns from the nozzles 65 into the air surrounding the crops. Typically, when the temperature drops to this range the relative humidity concomitantly increases and saturation of the air mass with water vapor due to evaporation of the droplets rapidly occurs. Thereafter, a visible fog is produced having a multitude of water droplets in the size range of from about five to 50 microns and with an average droplet diameter in the range of about 10 to 30 microns.

The frost protection technique provided in practice of this inveniton generates real fog which is equivalent in every way to natural fog and is the most effective and economical system available. The principles involved are simple. First, the fog system raises the humidity and dew point, and high dew points and hihg humidity prevent rapid cooling of fruit and blossoms because of the release of latent heat of condensation when water condenses onto the fruit and blossom surfaces. Second, cooling rates are further inhibited when radiation looses are slowed down because of the fog blanket.

The described technique is unique and different from other fog systems because it produces a cool dense fog which naturally puddles in low-lying frost pocket areas where it is needed the most. Since an inversion is not required to hold the fog down, the fog can be produced at any time regardless of temperature. Also the operating costs are so low, about ½ cent per acre per hour, that it is economically feasible to start the system just before sunset when the radiation cooling begins, and run it all night until several hours after sunrise. Cooling is thus inhibited from the very beginning while temperatures are still warm, instead of waiting until frost danger is imminent.

Frost will not occur if fog forms naturally before the temperature falls below the freezing point. The problem has been that up until now no one has been able to build a fog generating machine that would economically produce large volumes of fog with the correct drop sizes with an adequate amount of water in the fog to act as a heat conserving blanket in the same manner as a natural fog. These problems are solved in practice of this invention.

Radiation frosts occur on clear nights with no wind, particularly under atmospheric conditions of low humidity and low dew point. The mechanism which causes the cooling is radiation heat loss from the earth's surface and from the plant leaves and fruit blossoms. As energy is lost, surface temperatures are lowered and the air is contact with the surfaces is thus also cooled. An important factor to remember in the economical use of frost protection schemes is that it is the earth and plants that cool the air rather than the air that cools the plants. When fog is present it reduces radiation losses and water condenses on the lants and prevents the surfaces from cooling and thus also prevents the air from cooling.

In hilly terrain the frost danger is made worse in the lowlying areas because the air that is cooled by contact with the earth on the hillsides always flows downhill and puddles in the basin areas where it is further cooled because of continuing radiation losses. Natural fog and the fog produced in practice of this invention also naturally puddle in low-lying areas where it is needed most.

Typical cooling rates on a clear frost-prone night are about 3 degrees per hour. Tests with this invention indicate that this rate can be slowed to about 0.3 degree per hour. If the radiation loss can be stopped or slowed down, then the cooling will not be adequate to cause frost. Fog serves to stop the cooling in several ways. One way is the blanketing effect; However, to be effective as a blanket the fog must have droplets that are just the right size to back scatter the longwave radiation emitted by the earth's surface. The proper drop size is between 10 and 50 microns in diameter. Larger droplets fall to the ground and smaller droplets are not effective as radiation reflectors. Such a fog having a major portion of droplets in the size range of from about five to 50 microns and an average diameter in the range of from about 10 to 30 microns is readily obtained in practice of this invention.

Another important factor is that there must be enough water in the fog. About 10 to 15 grams of fog water in the proper drop sizes are required over each square meter of ground surface to reduce the radiation loss to one-tenth of its clear air value. The depth of the fog is relatively unimportant but typically would be 30 to 300 feet. If there is less water than this in the fog, the radiation losses would be correspondingly greater. Tests with this invention have produced fogs 30 to 50 feet deep with a liquid water content of two grams per cubic meter. This is equivalent to more than about 20 grams of fog water over every square meter of ground.

Another way in which pure water fog helps to reduce frost damage is through the release of latent heat of condensation, over 570 calories per gram of water condensed. Since in pure water fogs the relative humidity is always 100 percent, if the fog temperature is above freezing, then the dew point temperature must also be above freezing and in fact will equal the fog temperature. This fact is very important since the dew point is the temperature at which water will condense onto a surface. Leaves and blossoms cannot cool below the dew point because water will condense onto the surfaces and the release of latent heat causes that surface to be heated. The fog frost protection system provided in practice of this invention offers a number of advantages over other fog systems. One of the most important factors is that the fog is not heated but rather is cool and dense and thus naturally seeks out the lowlying frost pocket areas. It is very important that frost protection fog can cool. With a warm fog it would be extremely difficult and perhaps impossible to target the fog over the desired fog-danger areas. This happens because the cold air, which always must slide downhill and puddle in the frost pocket areas, must also displace the air that lies just a few feet above the ground. This means that very often the air just a few feet above the ground will drift uphill while the cold air is drifting downhill. Thus warm fog will always have a tendency to drift away from frost danger areas. On the other hand, the cool fogs produced in practice of this invention always have a tendency to drift into the low-lying areas which is exactly where the fog is needed the most. Installation costs of the fog system are typically $200 an acre or less and operating costs about ½ cent per acre per hour. Tests indicate that on radiational cooling nights the system should be capable of maintaining above-freezing temperatures on nights that would normally cool down to 18°F. Because the operating costs are so low, the system in a typical installation may be activated before sunset on frost danger nights and allowed to run until several hours after sunrise. Thus heat is conserved as soon as cooling takes place at sunset and, under most situations, above-freezing temperatures are maintained all night long. Other benefits of a frost protection system in a citrus orchard or the like are its uses for cooling and humidifying on hot dry summer days. The properties of the atmosphere are such that when the temperature is cold, evaporation can produce only two to three degrees of cooling. This is because the atmosphere can hold only a small amount of water vapor at low temperatures. For example, the maximum amount of water vapor that the atmosphere can hold at 30°F is four grams per cubic meter; at 120°F it can hold 90 grams per cubic meter. Once the atmosphere is saturated with water vapor, any additional water will cause fog droplets to form. (It is important to realize the distinction between the liquid water that forms cloud droplets and the water vapor which causes humidity and is always present in the air.) Thus on a typical frost-prone night when the humidity might typically be 80 percent at sunset with a temperature of 45°, the maximum evaporative cooling that could occur would be 3°. When the fog system of FIG. 7 is turned on under these conditions the temperature of the fog would immediately drop to 42° and would then stabilize. However, on a hot summer day when the temperatures are 110° and the humidity 10 percent, the system of FIG. 7 would produce no fog because all of the droplets would evaporate immediately, but in evaporating the temperature of the lower 10 to 20 feet of air would typically be lowered from 110° to about 85° and the humidity from 10 percent to about 50 percent. This has important applications for some farm crops such as citrus where fruit drop is caused by high temperatures and low humidities and in some cases the viability of fresh buds is affected by high temperatures.

In addition to the cooling effect and rise in humidity that is obtained by injecting water droplets in the size range of from about five to 50 microns into the environment near an orchard, a significant benefit can be obtained by enhancing crop growth. It will be noted that the air that is cooled in practice of this invention is more dense than the surrounding air and therefore tends to lie near the ground. The cooling and high humidity are therefore obtained in the region adjacent the crops where it is most needed. One of the factors that influences the rate of crop growth is also the carbon dioxide availability in the environment.

Typically, the total carbon dioxide concentration in the atmosphere is about 0.3 gram per cubic meter of air. It has been found that by increasing the carbon dioxide concentration to about 2.4 grams per cubic meter in greenhouses or the like, very significant increases in the rate of crop growth are obtained. The same effect is obtainable in the open environment in practice of this invention since cool air that tends to lie near the ground is produced and any carbon dioxide added therefore also tends to remain near the ground and in the region where it is best assimilated by the crops.

Referring again to FIG. 7, an injector 68 is provided in combination with the filter 61, which in a preferred arrangement injects carbon dioxide under pressure into the water supply. The injection of carbon dioxide can be either before or after the pumping system, however, the solubility of carbon dioxide in water increases substantially with increasing pressure. Thus at normal ambient temperatures and pressures, the solubility of carbon dioxide in water is about 0.3 gram of carbon dioxide per 100 grams of water. At a pressure of about 30 atmospheres, which is preferably employed in practice of this invention, the solubility of carbon dioxide is over ten times as high as at atmospheric pressure.

It should also be noted that it is not necessary that the carbon dioxide injected into the water supply be entirely in solution in the water, and that bubbles of carbon dioxide can pass through the pipes and fog nozzles without any detrimental effect. Although it is preferred that the carbon dioxide be injected into the environment by way of an injector 68 in combination with the fog producing system, it will be apparent that other means for generating or releasing carbon dioxide in the cooled air adjacent the orchard can be employed as desired for enhancing crop growth during the day.

The injector 68 may also comprise means for injecting other materials into the water supply instead of, or in addition to, carbon dioxide. Thus, for example, foliar feeds are often applied directly to the foliage of orchards in order to fertilize the trees with very little loss of fertilizer to the ground. The injector 68 can be employed for mixing such foliar feeds with the water injected into the environment by the nozzles so as to fertilize the crops at the same time they are cooled. Such fertilizing can be employed at any desired time and may not be deferred until such time as temperature is high. It may be, for example, desirable to provide such fertilizing during the nighttime hours when breeze conditions are typically less severe and minimum dispersion of the fertilizer is obtained.

If will also be apparent to one skilled in the art that fungicides, insecticides and other similar materials may be injected by the injector 68 in order to provide protection to the crops. Thus, the injector 68 may add most materials that are soluble in water or which can be put into the water supply in a fluid form, either as gas bubbles in the case of carbon dioxide, or emulsified liquids as in the case of certain insecticides. If any particulate materials are added to the water, the particle size should be less than about 10 percent of the diameter of the nozzle orifice in order to minimize any opportunity for plugging of the fine orifices in the nozzles.

Another significant application of the cooling effect obtained by injecting water droplets in the size range of from about five to 50 microns into the environment involves cooling of the air along runways of airports. During hot weather, particularly at high altitude airports, the density of air over the runways drops very significantly and may drastically influence the ability of airplanes to take off. The effect is evidenced by the decreased lift obtainable from the low density air, and of more significance the decreased oxygen content of the air. This is of significance since a large volume of air must be pulled into a jet engine to provide oxygen for combustion for obtaining sufficient power to take off. At present, jet aircraft often carry large quantities of water aboard the aircraft to inject into the intake portions of the jet engine to cool the incoming air and increase its density so that a larger volume of oxygen can be pulled through the engine. This enhances power availability from the engines but may limit payload since the water that must be carried for this purpose represents weight that is more profitably lifted as payload.

It is, therefore, desirable to deploy means for injecting water droplets in the size range of from about five to 50 microns in the region surrounding an airport runway in order to lower the temperature of the air in this region. The lowering temperature increases the density of the air, which enhances lift adjacent the ground and enhances the power of the aircraft taking off. Thus aircraft may have higher payloads or take off on shorter runways. Other useful situations where the cooling effect of injecting tiny water droplets into the environment will be apparent to one skilled in the art.

As mentioned hereinabove fogging for frost protection is commenced before the temperature drops into the range of about 40°F or even above if the humidity is low. This is done since the evaporative cooling that occurs as the small droplets evaporate lowers the temperature of the droplets and if sufficiently lowered, freezing may occur and the droplets fall as snow, thereby being substantially ineffective in protecting the crops from frost damage. This phenomenon is, however, highly desirable from an entirely different point of view since an environmental control system as provided in practice of this invention can be operated when the temperature is at or near freezing to cause artificial snowfall for its decorative effect or, more importantly, for augmenting or replacing naturally occurring snow on ski surfaces and the like. In such an arrangement a plurality of fog producing nozzles such as hereinabove described and illustrated are provided in and around the area on which it is desired to accumulate snow, and such nozzles are operated when the air temperature drops below about 40°F so that freezing occurs as evaporative cooling lowers the temperature of the water droplets.

Means may be employed for nucleating the formation of ice crystals since the water droplets are relatively stable even if substantially supercooled. Conventional means may be employed for nucleating snowfall in the region of a ski run such as, for example, expanding a small volume of compressed air to supercool some of the droplets to a temperature where they inherently freeze. Conventional seeding with dry ice or silver iodide may be used also. The arrangement provided in practice of this invention is preferred to prior snow making techniques since the water droplets are not heated upon injection into the environment and therefore best form snow in the desired areas. One prior technique has essentially boiled water prior to forming snow and great energy is required. The warm "fog" produced also tends to rise. Another technique atomizes water with expanding air, however, the energy required for compression of the air is nearly as high as that needed to boil water.

FIG. 8 illustrates in transverse cross section a shelter within which the environment is controlled by an environmental control system constructed according to principles of this invention. As illustrated in this embodiment, a roof 71, preferably of highly reflective material, is supported intermittently by transverse roof beams 72 atop intermittent side posts 73. The two sides of the structure are the same and are about eight feet high at the eaves. A lower opening 74 is provided along substantially the entire length of the structure at approximately the bottom two feet of the side portion so that air can pass freely through the side. Similarly, an upper opening 75 about two feet high is provided beneath the eaves along substantially the entire length of the structure.

Between the upper and lower openings 75 and 74, respectively, there is a four-foot-wide strip of screen 76 extending along the length of the shelter. This screen is a fine mesh plastic, for example, that permits about 80° of the sunlight to pass but which effectively inhibits a high flow of wind transverse to the shelter.

Along the center of the shelter and about 6 ½ feet above ground level there is provided a fog nozzle bearing pipe 77 hung from the roof beams 72 by wires 78. Preferably, a shallow trough 79 is provided beneath the pipe 77 so that any water that may drip from the fog nozzles is collected and conveyed to a portion of the shelter where it can be disposed of. When the temperature in the shelter threatens to become excessive, fogging is commenced from the fog nozzle bearing pipe 77. Water droplets in the size range of five to 50 microns are injected into the air in the center portion of the building. Evaporation of the droplets cools this air, thereby increasing its density and causing it to fall. This lowering cool air is replaced by warmer air flowing through the upper openings 75 and toward the center of the building as indicated by the arrows 80. The cooler air flows outwardly from the center of the shelter and passes through the lower opening 74, thereby establishing a natural convection pattern within the shelter wherein the cooler air is adjacent ground level.

Such a shelter within which the environment is controlled is particularly advantageous for turkeys or the like which are rather susceptible to elevated temperatures. The lower opening 74 not only permits the exit of cool air from the shelter but also provides access for turkeys which are permitted to roam in and out as they wish. The roof provides shade for the turkeys and the fog produced helps keep them cool. The screens 76 protect the turkeys from high winds, and also minimize the effect of gentle winds on the fog-produced cooling within the shelter. The openings at the top and bottom of the screen 76 promote natural convection and thereby prevent the formation of visible fog within the shelter when low winds are encountered. It might be noted that when moderate breezes are present, it is necessary to employ a larger amount of water due to more rapid dissipation of the cool air and, therefore, it may be desirable in some circumstances to provide an additional fog nozzle bearing pipe along the length of the building at its center for augmenting the quantity of water injected into the environment, or if desired two additional nozzle bearing pipes between the center and the two sides can be employed to compensate for transverse winds.

It will be apparent, of course, that such a shelter can be employed for stock other than turkeys, and that other building arrangements can be provided wherein the supply of air within the building is continually replaced either due to natural convection or due to augmented air flow by means of fans or the like. Many other uses of an environmental control system capable of lowering elevated temperatures, producing fogs opaque to visible or infrared radiation, or producing snow will be apparent to one skilled in the art.

FIG. 9 illustrates in transverse cross section another embodiment of fog producing nozzle constructed according to principles of this invention. As illustrated in this embodiment, the nozzle is also in the form of a saddle tee having a body 84 capable of withstanding internal pressure in the range of from at least 350 to 500 psi clamped to a pipe 85 by a U-shaped bracket 86. A hollow metal plug 87 is molded in the plastic body 84 and aligned with a hole 88 through the side of the pipe 85. Staked into the metal plug 87 is a hook-shaped pin 89 having a spherical end 91 (best seen in FIG. 10) over an orifice 92 in the plug 87.

As in the embodiment hereinabove described and illustrated in FIG. 3, the orifice 92 has a diameter H in the range of from about 125 to 400 microns so that when water at a pressure in excess of 350 psi is provided within the plug 87 a water jet having the diameter of the orifice is ejected at a velocity in excess of 135 feet per second. The spherical end 91 of the pin 89 is positioned before the aperture and spaced apart therefrom by a distance S, and in this embodiment having a curved solid surface 91 against which the water stream can impact, it is found that the distance S is less cirtical and can be several millimeters, for example.

The radius of curvature R of the spherical end 91 of the pin is preferably in the order of about 500 microns and can be in the range of from about 250 to 1500 microns without significantly degrading performance of the fog producing nozzle. The center of curvature of the end 91 is also deliberately offset from the axis of the orifice 92 by an amount M rather than being directly in line therewith. The direction of offset of the end of the pin from the axis of the orifice is towards the portion of the hook-shaped pin 89 (FIG. 9) interconnecting the tip and the plug 87. The optimum amount of offset M is readily determined impirically for a selected pin and orifice size to obtain the desired fogging pattern.

When a pin, either rounded as illustrated in FIG. 10 or flat as illustrated in FIG. 3, is exactly centered on the orifice the resultant conical sheet of water and hence array of fog droplets is substantially uniform in all directions radially from the pin. Because of the mechanical interconnection between the pin and the body in which the orifice is provided there is typically a small are adjacent the orifice where a mechanical obstruction to radial flow of fog is present. Fog droplets striking the supporting post adhere to it and accumulate to form larger drops that fall from the fogging nozzle. In one embodiment of such nozzle having a flat pin, it is found that a little more than 10 percent of the water passing through the orifice strikes the supporting post and drips from the region of the nozzle. This amount of water represents an inefficiency in the fogging system and is preferably avoided.

By deliberately offsetting the center of curvature of the surface 91 from the axis of the orifice 92, the distribution of water in the fog produced is skewed to one side, and when the spacing M is properly selected empirically an arc of about 30° centered in the direction of the offset is substantially free of any fog. Since the offset is in the direction of the supporting post, very little of the fog produced by the nozzle actually impacts against the post and is therefore free to be injected into the surrounding environment. This results in a very high efficiency in the fogging nozzle with substantially all water available for evaporation into the environment.

It is found that, although quite convenient for manufacturing purposes, it is not necessary that a spherical surface be employed in the offset arrangement such as provided in FIG. 10. It is found that a smooth, solid surface having compound convexity in differing degrees can be employed. By compound convexity is meant that the surface is convex in and near the region of impact of the water stream in any plane containing the axis of the stream of water. Thus, the stream impacts on a smooth surface that curves away from the region of impact in all directions.

In the embodiment illustrated in FIG. 3, the flat end surface of the pin is substantially normal to the axis of the orifice through which the water jet is ejected. This results in a substantially uniform radial distribution of fog droplets around the pin. It might be supposed that tilting of the plane surface of the end of a flat pin would direct the fog droplets produced to one side. This is, in fact, the case, and some nonuniformity of fog droplet distribution can be obtained in this manner; however, a significant side effect is obtained that degrades performance more than impact of a portion of the droplets on the supporting pin. As a flat surface is tilted relative to the axis of the water jet, a substantial portion of the water forms in a pair of streams ejected towards each side and of sufficiently large size that droplets much larger than the desired range are produced. Thus, for example, if a flat surface is tilted at the proper angle (depending on the jet velocity and diameter), a spray of droplets covering an angle of about 180° can be obtained, and about half of the water passing through the orifice appears as a fog in this region. At the same time, however, a pair of heavier streams flow laterally from the pin and break up into large droplets that fall inefficiently without forming fog or substantial evaporation.

It is found that a flat surface skewed away from normal to the axis of the orifice by more than a small amount tends to produce droplets in which a significant portion are larger than about 50 microns and, therefore, for most applications such an arrangement is impractical. Similarly, if the flat surface is significantly larger than the stream of water impacting thereon, the tendency of the water to wet and adhere to the flat surface apparently slows the radial velocity enough that a significant portion of the droplets have diameters in excess of about 50 microns. The effect of the edge of the flat surface becomes important when it is enlarged and, further, the spray of fog is flattened. Apparently with a compound curved surface wherein the radius of curvature is in the order of about 500 microns, the radiating sheet of water separates from the surface quickly rather than traveling any substantial distance along the surface, and the velocity is not significantly reduced.

The use of a compound curved surface in front of the orifice substantially relaxes the requirement for close spacing between the surface and the orifice, and this is apparently due to the significantly larger acceptable size of the compound curved surface as compared with the flat surface so that the location of impact of the water stream on the surface is much less critical. The inherent oscillation of the water stream over the distance S between the orifice and the pin will not vary the location of impact sufficiently to degrade performance so long as the distance is small enough that the oscillation has not caused the stream to break into separated droplets. A spacing of about four millimeters has been found to be satisfactory.

FIGS. 11 and 12 illustrate a simplified nozzle having a compound curved impact surface and constructed according to principles of this invention. As illustrated in this embodiment, there is provided a hollow body 96 capable of withstanding an internal pressure of at least 350 psi and exteriorly threaded for connection to a water supply. An orifice 97 is provided in the body in communication with the hollow interior. As in the previously described embodiments the orifice 97 has a diameter in the range of from about 125 to 400 microns.

Integral with, or connected to, the body 96 is a hook-shaped post 98 that extends upwardly and ends in a compound curved surface 99 immediately in front of the orifice 97. The compound curved surface 99 can be as much as three or four millimeters away from the orifice, and the exact curvature thereof is not found to be critical so long as it is smooth and in the general order of about 500 microns, that is in the range of about 250 to 1500 microns. Preferably, the center of the principal curvature of the surface 99 is between the axis of the orifice and the post 98 so that the principal portion of the fog produced when the water stream impacts on the surface is ejected into the environment in a direction that does not cause impact against the post so as to promote optimum efficiency in the fogging nozzle.

It is particularly preferred in embodiments of nozzle having compound convexity at the point of impact with the water stream, that the orifice have a diameter of about 250 microns. This particular size is preferred since operation of such a nozzle at a pressure in excess of about 350° psi results in injection of water droplets having an average diameter of about 15 microns. As pointed out hereinabove, this particular droplet size distribution is of particular advantage in obtaining high evaporation rate without undue energy expenditure, and a fog produced of such droplets in near optimum for infrared backscattering. Such an orifice size minimizes manufacturing costs of individual nozzles and minimizes the number of nozzles required in a system while still maintaining a preferred droplet size distribution.

Several embodiments of environmental control system incorporating principles of this invention have been described and illustrated herein. It will be apparent to one skilled in the art that many modifications and variations can be provided in such systems, such as, for example, the arrangement of means for injecting water droplets into the environment can be widely varied to make the water droplet injection conform to the natural or artificial terrain and the prevailing wind and weather conditions. Likewise, several embodiments of fog producing nozzle for injecting water droplets in the range of from about five to 50 microns into the environment have been described and illustrated herein. Many other arrangements for obtaining impact of a high velocity stream on a smooth, solid surface for efficient droplet production will be apparent to one skilled in the art. Because of the many possible modifications and variations, it is to be understood that within the scope of the appended claims the invention may be practiced otherwise than as specifically described.

What is claimed is:

1. An environmental control system for increasing the total water content of a volume of air comprising:
   filter means for removing substantially all particles having a size greater than about five microns from a water supply;
   pump means connected to the filter for producing a water pressure of at least 350 psi;
   a plurality of orifice and pin nozzle means for producing water droplets with a major portion of the droplets having diameters in the range of from about five to 50 microns and an average diameter in the range of from about 10 to 30 microns; and
   noncorrodible means for conveying water from the filter means to the nozzle means at a pressure of at least 350 psi.

2. A system as defined in claim 1 wherein said nozzle means are distributed along at least one side of an outdoors area and elevated a substantial distance above ground level.

3. An environmental control system as defined in claim 2 further comprising means for controlling the flow of air in the outdoors area.

4. An environmental control system as defined in claim 2 wherein the nozzle means are distributed adjacent crops to be protected against temperature extremes.

5. An environmental control system as defined in claim 4 further comprising means for sprinkling warm water on the crops.

6. An environmental control system as defined in claim 4 further comprising means for adding carbon dioxide to the environment.

7. An environmental control system as defined in claim 1 further comprising means for injecting a fluid additive into water prior to the nozzle means.

8. A system as defined in claim 1 further comprising:
   a roof;
   a side wall portion between the roof and the ground and including a substantial open region adjacent the roof and a substantial open region adjacent the ground for accommodating a substantial convection air circulation; and wherein
   said nozzle means are arrayed in a region beneath the roof and remote from the side wall portions.

9. Means for increasing the total water content of a volume of air comprising:
   a source of water substantially free of particles larger than about five microns;
   means connected to the source of water for maintaining water pressure of at least 350 psi;
   orifice and pin nozzle means connected to the means for maintaining water pressure for producing water droplets a major portion of which have diameters in the range of from about five to 50 microns and wherein the droplets have an average diameter in the range of from about 10 to 30 microns; and noncorrodible means for conveying water between the means for supplying water and the means for producing water droplets at a pressure of at least 350 psi.

10. A system for protecting an agricultural area from frost damage comprising:

means for supplying water substantially free of particles larger than about five microns;

means connected to the source of water for maintaining water pressure of at least 350 psi;

means adjacent the agricultural area for ejecting water in the form of droplets having substantially the same temperature as water from the means for supplying, a major portion of the droplets having diameters in the range of from about five to 50 microns and an average diameter in the range of from about 10 to 30 microns comprising a plurality of orifice and pin nozzles, each having a water orifice diameter in the range of from about 125 to 400 microns; and a smooth solid surface on the pin opposite the orifice for deflecting a stream of water therefrom.

11. A system as defined in claim 10 further comprising:

means for supplying heat adjacent an edge of the agricultural area.

12. A system as defined in claim 11 wherein the means for supplying heat comprises means for sprinkling water at a temperature substantially above freezing along an edge of the agricultural area.

13. A system as defined in claim 10 wherein the smooth surface comprises a flat surface having a diameter substantially the same as the diameter of the orifice and substantially normal to the axis thereof, the center of the flat surface being aligned with the axis of the orifice within less than about 15 microns.

14. A system as defined in claim 10 wherein the smooth solid surface comprises a compound curved convex surface having a radius of curvature in the range of from about 125 to 1500 microns; and wherein a principal center of curvature of the compound curved convex surface is offset from the axis of the orifice.

15. A method for increasing the total water content of a volume of air comprising the step of injecting water droplets into the volume of air wherein a major portion of the water droplets are in the size range of from about fve to 50 microns and the droplets have an average diameter in the range of from about 10 to 30 microns comprising impacting a water jet having a diameter in the range of from about 125 to 400 microns and traveling at a velocity greater than about 135 feet per second against a smooth, solid surface.

16. A method as defined in claim 15 wherein the step of injecting comprises impacting the water jet against a flat surface substantially normal to the direction of travel of the water jet and having a diameter substantially the same as the diameter of the water jet.

17. A method as defined in claim 15 wherein the step of injecting comprises impacting the water jet against a smooth compound convex surface having radii of curvature in the order of about 500 microns, and wherein a principal center of curvature of the convex surface is offset from the axis of the jet of water.

18. A method as defined in claim 15 wherein the step of injecting comprises impacting the water jet against a smooth spherical surface having a radius of curvature in the range of from about 125 to 1500 microns.

19. A method for converting a major portion of a water supply into droplets a principal portion of which have diameters in the range of from about five to 50 microns and wherein the droplets have an average diameter in the range of from about 10 to 30 microns comprising the steps of:

forcing water through an orifice having a diameter in the range of from about 125 to 400 microns with a pressure in excess of about 350 psi on the water; and impacting the water jet so forced against a smooth, solid surface spaced apart from the orifice.

20. A method as defined in claim 19 wherein the impacting step further comprises impacting the water against a compound curved convex surface having a center of curvature offset from the center of the jet of water.

* * * * *